United States Patent
Barclay et al.

(10) Patent No.: US 11,247,387 B2
(45) Date of Patent: Feb. 15, 2022

(54) ADDITIVE MANUFACTURING SYSTEM WITH PLATEN HAVING VACUUM AND AIR BEARING

(71) Applicant: Stratasys, Inc., Eden Prairie, MN (US)

(72) Inventors: Aaron Barclay, Prior Lake, MN (US); Adam Watterson, Savage, MN (US)

(73) Assignee: Stratasys, Inc., Eden Prairie, MN (US)

( * ) Notice: Subject to any disclaimer, the term of this patent is extended or adjusted under 35 U.S.C. 154(b) by 89 days.

(21) Appl. No.: 16/557,228

(22) Filed: Aug. 30, 2019

(65) Prior Publication Data

US 2020/0070405 A1 Mar. 5, 2020

Related U.S. Application Data

(60) Provisional application No. 62/725,031, filed on Aug. 30, 2018.

(51) Int. Cl.
*B29C 64/118* (2017.01)
*B29C 64/245* (2017.01)
(Continued)

(52) U.S. Cl.
CPC .......... *B29C 64/118* (2017.08); *B29C 64/209* (2017.08); *B29C 64/227* (2017.08);
(Continued)

(58) Field of Classification Search
CPC .......... B22F 12/30; B22F 12/33; B22F 12/37; B29C 64/118; B29C 64/209;
(Continued)

(56) References Cited

U.S. PATENT DOCUMENTS 4,567,489 A 1/1986 Obstfelder et al.
4,728,392 A 3/1988 Miura et al.
(Continued)

FOREIGN PATENT DOCUMENTS

DE 102010015451 A1 10/2011
GB 816016 7/1959
(Continued)

OTHER PUBLICATIONS

Canadian Office Action dated Aug. 11, 2017 for corresponding Canadian Application No. 2,880,307, filed Feb. 20, 2014.
(Continued)

*Primary Examiner* — Joseph S Del Sole
*Assistant Examiner* — Manley L Cummins, IV
(74) *Attorney, Agent, or Firm* — Peter J. Ims; Westman, Champlin & Koehler, P.A.

(57) ABSTRACT

A hold and release platen system for use in extrusion-based additive manufacturing system includes a platen, a vacuum source and a pressurized air source. The platen has a surface including a plurality of holes therethrough. The vacuum source is configured to provide a vacuum through the plurality of holes, and the pressurized air source is configured to eject pressurized fluid through the plurality of holes. A method includes positioning a sheet substrate on the platen surface; pulling a vacuum through one or more holes in the platen surface to secure the sheet substrate; printing a part on the sheet substrate by moving a print head along a tool path and extruding material in the path; and ejecting pressurized air through the one or more holes to create an air bearing beneath the substrate thereby facilitating removal of the sheet substrate and the printed part from the platen.

18 Claims, 6 Drawing Sheets

(51) Int. Cl.
  *B29C 64/379* (2017.01)
  *B29C 64/371* (2017.01)
  *B29C 64/227* (2017.01)
  *B29C 64/209* (2017.01)
  *B29C 64/295* (2017.01)
  *B33Y 40/00* (2020.01)
  *B33Y 10/00* (2015.01)
  *B33Y 30/00* (2015.01)

(52) U.S. Cl.
  CPC .......... *B29C 64/245* (2017.08); *B29C 64/295* (2017.08); *B29C 64/371* (2017.08); *B29C 64/379* (2017.08); *B33Y 10/00* (2014.12); *B33Y 30/00* (2014.12); *B33Y 40/00* (2014.12)

(58) Field of Classification Search
  CPC ... B29C 64/227; B29C 64/245; B29C 64/295; B29C 64/371; B29C 64/379; B33Y 10/00; B33Y 30/00; B33Y 40/00
  See application file for complete search history.

(56) References Cited

U.S. PATENT DOCUMENTS

| | | |
|---|---|---|
| 5,121,329 A | 6/1992 | Crump |
| 5,169,081 A | 12/1992 | Goedderz |
| 5,303,141 A | 4/1994 | Batchelder et al. |
| 5,312,224 A | 5/1994 | Batchelder et al. |
| 5,340,433 A | 8/1994 | Crump |
| 5,370,467 A | 12/1994 | Ikehata et al. |
| 5,503,785 A | 4/1996 | Crump et al. |
| 5,738,817 A | 4/1998 | Danforth et al. |
| 5,764,521 A | 6/1998 | Batchelder et al. |
| 5,866,058 A | 2/1999 | Batchelder et al. |
| 5,900,207 A | 5/1999 | Danforth et al. |
| 5,939,008 A | 8/1999 | Comb et al. |
| 5,968,561 A | 10/1999 | Batchelder et al. |
| 6,004,124 A | 12/1999 | Swanson et al. |
| 6,022,207 A | 2/2000 | Dahlin et al. |
| 6,054,077 A | 4/2000 | Comb et al. |
| 6,067,480 A | 5/2000 | Stuffle et al. |
| 6,070,107 A | 5/2000 | Lombardi et al. |
| 6,085,957 A | 7/2000 | Zinniel et al. |
| 6,129,872 A | 10/2000 | Jang |
| 6,193,923 B1 | 2/2001 | Leyden et al. |
| 6,228,923 B1 | 5/2001 | Lombardi et al. |
| 6,257,517 B1 | 7/2001 | Babish et al. |
| 6,547,995 B1 | 4/2003 | Comb |
| 6,644,703 B1* | 11/2003 | Levin .................. B25J 15/0616 279/3 |
| 6,645,412 B2 | 11/2003 | Priedeman, Jr. et al. |
| 6,685,866 B2 | 2/2004 | Swanson et al. |
| 6,722,872 B1 | 4/2004 | Swanson et al. |
| 6,730,252 B1 | 5/2004 | Teoh et al. |
| 6,749,414 B1 | 6/2004 | Hanson et al. |
| 6,790,403 B1 | 9/2004 | Priedeman, Jr. et al. |
| 6,814,907 B1 | 11/2004 | Comb |
| 6,869,559 B2 | 3/2005 | Hopkins |
| 6,923,634 B2 | 8/2005 | Swanson et al. |
| 6,998,087 B1* | 2/2006 | Hanson et al. ....... B29C 64/118 264/308 |
| 7,122,246 B2 | 10/2006 | Comb et al. |
| 7,172,715 B2 | 2/2007 | Swanson et al. |
| 7,236,166 B2 | 6/2007 | Zinniel et al. |
| 7,384,255 B2 | 6/2008 | LaBossiere et al. |
| 7,604,470 B2 | 10/2009 | LaBossiere et al. |
| 7,625,200 B2 | 12/2009 | Leavitt |
| 7,891,964 B2 | 2/2011 | Skubic et al. |
| 7,896,209 B2 | 3/2011 | Batchelder et al. |
| 7,936,351 B2 | 5/2011 | Taatjes et al. |
| 7,938,351 B2 | 5/2011 | Taatjes et al. |
| 7,938,356 B2 | 5/2011 | Taatjes et al. |
| 8,033,811 B2 | 10/2011 | Swanson et al. |
| 8,075,300 B2 | 12/2011 | Zinniel |
| 8,123,999 B2 | 2/2012 | Priedeman, Jr. et al. |
| 8,153,182 B2 | 4/2012 | Comb et al. |
| 8,215,371 B2 | 7/2012 | Batchelder |
| 8,221,669 B2 | 7/2012 | Batchelder et al. |
| 8,236,227 B2 | 8/2012 | Batchelder et al. |
| 8,246,888 B2 | 8/2012 | Hopkins et al. |
| 8,403,658 B2 | 3/2013 | Swanson |
| 8,459,280 B2 | 6/2013 | Swanson et al. |
| 8,647,102 B2 | 2/2014 | Swanson et al. |
| 8,658,250 B2 | 2/2014 | Batchelder et al. |
| 8,985,497 B2 | 3/2015 | Mannella et al. |
| 9,073,263 B2 | 7/2015 | Mannella et al. |
| 9,108,360 B2 | 8/2015 | Comb et al. |
| 9,168,697 B2 | 10/2015 | Crump et al. |
| 9,633,889 B2* | 4/2017 | Cuvalci .............. H01L 21/6875 |
| 9,636,868 B2 | 5/2017 | Crump et al. |
| 2004/0084814 A1* | 5/2004 | Boyd .................... B33Y 40/00 264/497 |
| 2005/0129941 A1 | 6/2005 | Comb et al. |
| 2005/0142846 A1* | 6/2005 | Frodis ................. B81C 1/00492 438/622 |
| 2007/0003656 A1 | 1/2007 | LaBossiere et al. |
| 2007/0228590 A1 | 10/2007 | LaBossiere et al. |
| 2008/0121172 A1 | 5/2008 | Kritchman et al. |
| 2008/0169585 A1 | 7/2008 | Zinniel |
| 2008/0213419 A1 | 9/2008 | Skubic et al. |
| 2009/0020901 A1 | 1/2009 | Schillen et al. |
| 2009/0035405 A1 | 2/2009 | Leavitt |
| 2009/0101278 A1 | 4/2009 | Laberge-Lebel et al. |
| 2009/0263582 A1 | 10/2009 | Batchelder |
| 2009/0273122 A1 | 11/2009 | Batchelder et al. |
| 2009/0274540 A1 | 11/2009 | Batchelder et al. |
| 2010/0005987 A1 | 1/2010 | Shapira |
| 2010/0096072 A1 | 4/2010 | Hopkins et al. |
| 2010/0096485 A1 | 4/2010 | Taatjes et al. |
| 2010/0096489 A1 | 4/2010 | Taatjes et al. |
| 2010/0100224 A1 | 4/2010 | Comb et al. |
| 2010/0161105 A1 | 6/2010 | Blake |
| 2010/0283172 A1 | 11/2010 | Swanson |
| 2010/0327479 A1 | 12/2010 | Zinniel et al. |
| 2011/0054663 A1 | 3/2011 | Matsui et al. |
| 2011/0074065 A1 | 3/2011 | Batchelder et al. |
| 2011/0076495 A1 | 3/2011 | Batchelder et al. |
| 2011/0076496 A1 | 3/2011 | Batchelder et al. |
| 2011/0117268 A1 | 5/2011 | Batchelder et al. |
| 2011/0121476 A1 | 5/2011 | Batchelder et al. |
| 2011/0233804 A1 | 9/2011 | Batchelder et al. |
| 2012/0046779 A1 | 2/2012 | Pax et al. |
| 2012/0067501 A1 | 3/2012 | Lyons |
| 2012/0068378 A1 | 3/2012 | Swanson et al. |
| 2012/0070523 A1 | 3/2012 | Swanson et al. |
| 2012/0105903 A1 | 5/2012 | Pettis |
| 2012/0162314 A1 | 6/2012 | Swanson et al. |
| 2012/0164256 A1 | 6/2012 | Swanson et al. |
| 2012/0164330 A1 | 6/2012 | Swanson et al. |
| 2013/0026680 A1 | 1/2013 | Ederer et al. |
| 2013/0269731 A1 | 10/2013 | Crouch et al. |
| 2013/0323415 A1* | 12/2013 | Brackley .............. B41M 5/0011 427/171 |
| 2014/0048980 A1 | 2/2014 | Crump et al. |
| 2016/0375491 A1* | 12/2016 | Swaminathan ......... B22F 10/20 419/53 |
| 2017/0297320 A1 | 10/2017 | Swanson |
| 2018/0065186 A1* | 3/2018 | Cullinan ............ H01L 21/67115 |
| 2018/0141273 A1* | 5/2018 | Santiago, Jr. ......... B29C 64/106 |
| 2019/0255612 A1* | 8/2019 | Mark .................... C04B 35/638 |

FOREIGN PATENT DOCUMENTS

| | | |
|---|---|---|
| JP | 2007098948 A | 4/2007 |
| JP | 2010510100 A | 4/2010 |
| JP | 2010517830 A | 5/2010 |
| WO | 2011127897 A2 | 10/2011 |

(56) References Cited

FOREIGN PATENT DOCUMENTS

WO   2012037329 A2   3/2012
WO   2012100297 A1   8/2012

OTHER PUBLICATIONS www.envisiontec.com, "3D-Bioplotter", Datasheet, Mar. 2011.
International Search Report and Written Opinion dated Oct. 22, 2013, from International Application No. PCT/US2013/055311.
Australian Examination Report dated Oct. 8, 2015 for corresponding Australian Patent Application No. 2013302496, filed Feb. 11, 2015.
Chinese Office Action dated Feb. 29, 2016 for corresponding Chinese Application No. 201380043692.1, filed Feb. 13, 2015.
Supplementary European Search Report dated Mar. 1, 2016 for corresponding European Patent Application No. 13829416.0, filed Feb. 3, 2015.
Korean Office Action dated Apr. 11, 2016 for corresponding Korean Application No. 10-2015-7006115, filed Mar. 9, 2015.
Canadian Examiner's Reported dated Jun. 2, 2016, for corresponding Canadian Application No. 2,880,307 filed Jan. 26, 2015.
Chinese Office Action dated Oct. 10, 2016 for corresponding Chinese Application No. 201380043692.1, filed Feb. 13, 2015.
Chinese Office Action dated Jan. 16, 2017 for corresponding Chinese Application No. 201380043692.1, filed Feb. 13, 2015.
Canadian Office Action dated Mar. 26, 2018 for corresponding Canadian Application No. 2880307, filed Jan. 26, 2015.
Extended European search report for European application No. 19150008.1, dated May 17, 2019, 9 pages.

\* cited by examiner

ADDITIVE MANUFACTURING SYSTEM WITH PLATEN HAVING VACUUM AND AIR BEARING

IN CROSS REFERENCE TO RELATED APPLICATION

The present application claims the benefit of U.S. Provisional Patent application Ser. No. 62/725,031 entitled ADDITIVE MANUFACTURING SYSTEM WITH PLATEN HAVING VACUUM AND AIR BEARING filed on Aug. 30, 2018, the contents of which are incorporated by reference in its entirety.

BACKGROUND

The present disclosure relates to additive manufacturing materials and techniques for printing parts. In particular, the present disclosure relates to a 3D printing utilizing a platen that utilizes both vacuum to secure a substrate to the platen and an air bearing that causes the substrate to displace from the platen. All references disclosed herein are incorporated by reference.

Additive manufacturing, also called 3D printing, is generally a process in which a three-dimensional (3D) object is built by adding material to form a 3D part, rather than subtracting material as in traditional machining. Using one or more additive manufacturing techniques, a three-dimensional solid object of virtually any shape can be printed from a digital model of the object by an additive manufacturing system, commonly referred to as a 3D printer. A typical additive manufacturing work flow includes slicing a three-dimensional computer model into thin cross sections defining a series of layers, translating the result into two-dimensional position data, and transmitting the data to a 3D printer, which manufactures a three-dimensional structure in an additive build style. Additive manufacturing entails many different approaches to fabrication, including material extrusion, ink jetting, selective laser sintering, powder/binder jetting, electron-beam melting, electrophotographic imaging, and stereolithographic processes.

Additive manufacturing technologies can be used for prototyping (where it has been used for many years) and also for end-use production. For end-use part production, it is desirable to print net-shape parts, or near-net shape parts (i.e., parts that match very closely to the digital image provided as a source data file, and therefore require little or no post-print processing to achieve the desired tolerances for the size and shape for the part).

In a typical extrusion-based additive manufacturing system (e.g., fused deposition modeling systems developed by Stratasys, Inc., Eden Prairie, Minn.), a 3D object may be printed from a digital representation of the printed part by extruding a viscous, flowable thermoplastic or filled thermoplastic material from a print head along tool paths at a controlled extrusion rate. The extruded flow of material is deposited as a sequence of roads onto a substrate, where it fuses to previously deposited material and solidifies upon a drop in temperature. The print head includes a liquefier that receives a supply of the thermoplastic material in the form of a flexible filament, and a nozzle tip for dispensing molten material. A filament drive mechanism engages the filament such as with a drive wheel and a bearing surface, or pair of toothed-wheels, and feeds the filament into the liquefier, where the filament is melted. The unmelted portion of the filament essentially fills the diameter of the liquefier tube, providing a plug-flow type pumping action to extrude the molten filament material further downstream in the liquefier, from the tip to print a part, to form a continuous flow or tool path of resin material. The extrusion rate is unthrottled and is based on the feed rate of filament into the liquefier, and the filament is advanced at a feed rate calculated to achieve a targeted extrusion rate, such as is disclosed in Comb U.S. Pat. No. 6,547,995.

In a system where the material is deposited in planar layers, the position of the print head relative to the substrate is incremented along an axis (perpendicular to the build plane) after each layer is formed, and the process is then repeated to form a printed part resembling the digital representation. In fabricating printed parts by depositing layers of a part material, supporting layers or structures are typically built underneath overhanging portions or in cavities that are not supported by the part material itself. A support structure may be built utilizing the same deposition techniques by which the part material is deposited. A host computer generates additional geometry acting as a support structure for the overhanging or free-space segments of the printed part being formed. Support material is then deposited pursuant to the generated geometry during the printing process. The support material adheres to the part material during fabrication and is removable from the completed printed part when the printing process is complete.

A multi-axis additive manufacturing system may be utilized to print 3D parts using fused deposition modeling techniques. The multi-axis system may include a robotic arm movable in six degrees of freedom. The multi-axis system may also include a build platform movable in two or more degrees of freedom and independent of the movement of the robotic arm to position the 3D part being built, such as to counteract effects of gravity based upon part geometry. An extruder may be mounted at an end of the robotic arm and may be configured to extrude material with a plurality of flow rates, wherein movement of the robotic arm and the build platform are synchronized with the flow rate of the extruded material to build the 3D part. The multiple axes of motion can utilize complex tool paths for printing 3D parts, including single continuous 3D tool paths for up to an entire part, or multiple 3D tool paths configured to build a single part. Use of 3D tool paths can reduce issues with traditional planar tool path 3D printing, such as stair-stepping (layer aliasing), seams, the requirement for supports, and the like. Without a requirement to slice a part to be built into multiple layers, each printed in the same build plane, the geometry of the part may be used to determine the orientation of printing, as well as the routing for all toolpaths. In a multi-axis system, material may be deposited in conformable 3D tool paths laid incrementally upon each other in nonplanar layers to form a printed part resembling the digital representation.

Build surfaces and substrates are used in additive process modeling techniques to stabilize a 3D printed part as it is built and allow removal of the part when it is complete. Typically, it is preferred that a part or model under construction be strongly adhered to its modeling substrate, and the modeling substrate can be removable to remove the completed part from the machine. Strains generated within the modeling material tend to warp the deposited structures unless the structures are supported in their correct orientation. Strong adherence to the substrate serves to prevent warpage and avoid localized shrinkage in foundation layers. Also, in some deposition processes, there are external forces that act on the deposited structures, such as pull from an extrusion nozzle, and centripetal acceleration on parts that are not stationary. Adherence of the printed part to the substrate must be sufficient to resist these forces. Delamination of a foundation layer from the substrate during the building of the object can result in a total failure in forming the object. Further, since the substrate is a defining surface for the object being built, the substrate itself must be held in a well-defined configuration. Typically, it is desirable that the substrate be held in a configuration approximating a plane.

SUMMARY

In one aspect, a system for 3D printing a part includes a platen having a platen surface including a plurality of holes therethrough and having an interior manifold in fluid communication with the plurality of holes, wherein the platen surface is configured to receive a build substrate. The system includes a vacuum source coupled to the manifold and configured to create a vacuum on the platen surface through the plurality of holes to thereby adhere a build substrate to the platen. The system further includes a pressurized air source coupled to the manifold and configured to eject pressurized air through the plurality of holes so as to create an air bearing on the platen surface, to thereby facilitate removal of a build substrate and a printed part from the platen.

In another aspect, a method for 3D printing a part includes providing a platen having a platen surface including a plurality of holes therethrough and positioning a sheet substrate on the platen surface. The method includes pulling a vacuum through the one or more holes to secure the sheet substrate on the platen surface during part fabrication. The method also includes printing a part on the sheet substrate by moving a print head along a tool path and extruding material in the tool path. The method includes ejecting pressurized air through the one or more holes after the part is printed to create an air bearing on the platen surface beneath the substrate to facilitate removal of the printed part and sheet substrate from the platen surface.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

Definitions

Unless otherwise specified, the following terms as used herein have the meanings provided below:

The terms "preferred," "preferably," "example," and "exemplary" refer to embodiments of the invention that may afford certain benefits, under certain circumstances. However, other embodiments may also be preferred or exemplary, under the same or other circumstances. Furthermore, the recitation of one or more preferred or exemplary embodiments does not imply that other embodiments are not useful, and is not intended to exclude other embodiments from the scope of the present disclosure.

Directional orientations such as "above," "below," "top," "bottom," and the like are made with reference to a layer-printing direction of a 3D part. In the embodiments shown below, the layer-printing direction is the upward direction along the vertical z-axis. In these embodiments, the terms "above," "below," "top," "bottom," and the like are based on the vertical z-axis. However, in embodiments in which the layers of 3D parts are printed along a different axis, such as along a horizontal x-axis or y-axis, the terms "above," "below," "top," "bottom," and the like are relative to the given axis.

The term "providing," such as for "providing a material," when recited in the claims, is not intended to require any particular delivery or receipt of the provided item. Rather, the term "providing" is merely used to recite items that will be referred to in subsequent elements of the claim(s), for purposes of clarity and ease of readability.

Unless otherwise specified, temperatures referred to herein are based on atmospheric pressure (i.e. one atmosphere).

The terms "about" and "substantially" are used herein with respect to measurable values and ranges due to expected variations known to those skilled in the art (e.g., limitations and variabilities in measurements).

The term "near-net part" refers to a part that is printed so that it is very close to its final shape after the initial printing. A near-net part matches closely to the digital image provided as a source data file, and therefore requires little or no post-print processing to achieve the desired tolerances for the size and shape for the part.

The term "out of oven" refers to a build environment that is not enclosed within a temperature controlled environmental chamber, but is used and operated outside the confines of an environmental chamber.

All cited patents and printed patent applications referenced herein are incorporated by reference in their entireties.

BRIEF DESCRIPTION OF THE DRAWINGS

The disclosed subject matter will be further explained with reference to the attached figures, wherein like structure or system elements are referred to by like reference numerals throughout the several views. It is contemplated that all descriptions are applicable to like and analogous structures throughout the several embodiments.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art that fall within the scope of the principles of this disclosure.

The figures may not be drawn to scale. In particular, some features may be enlarged relative to other features for clarity. Moreover, where terms such as above, below, over, under, top, bottom, side, right, left, vertical, horizontal, etc., are used, it is to be understood that they are used only for ease of understanding the description. It is contemplated that structures may be oriented otherwise.

DETAILED DESCRIPTION

Figure 1:
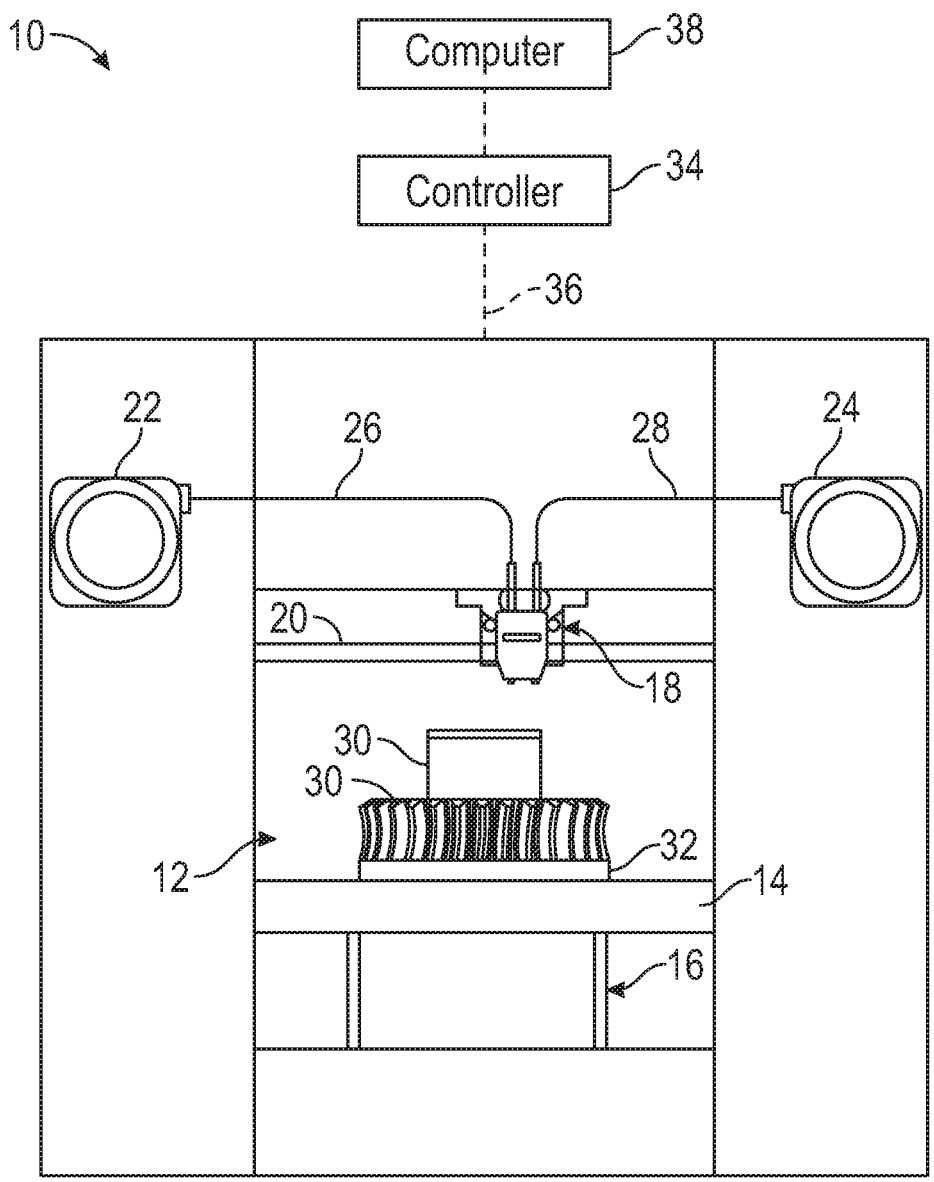
FIG. 1 is a front view of an exemplary additive manufacturing system configured to print 3D parts on a build platen.
Figure 2:
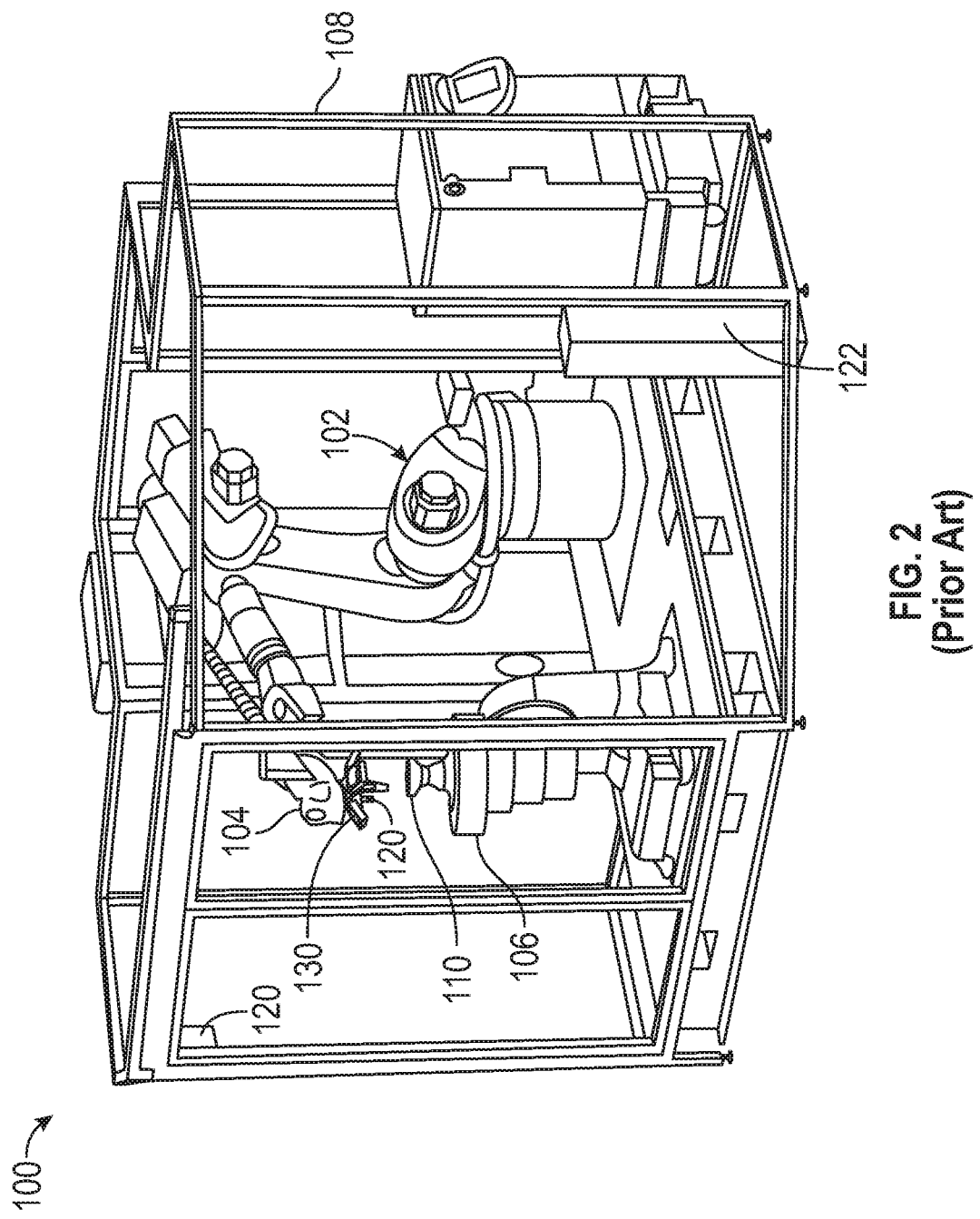
FIG. 2 is a perspective view of another exemplary additive manufacturing system configured to print 3D parts on a build platen.

The present disclosure is directed to an exemplary platen assembly configured for use as build platform in a 3D printing system, such as the hold and release platen system shown in FIG. 1 or 2, for example.

In the Stratasys Inc. U.S. Pat. No. 5,939,008 by Comb et al, a vacuum system is used to apply vacuum suction to a platen in order to secure a flexible substrate sheet in place during a 3D build. The flexible substrate is removable after the construction of the part is completed.

As 3D printing systems and other manufacturing systems allow for the production of larger and heavier parts, there can be difficulty in securing the increasingly heavy part (from subsequent build layers) on the build platen during the build, and moreover, in lifting or removing the part from the build platform after completion. As the 3D printing industry evolves, and the fabrication of large industrial parts such as car bumpers and airplane wings is becoming possible using larger additive manufacturing systems. However, large thermoplastic parts frequently can weigh more than 100 pounds upon completion. The removal of such a heavy part is still a manual process, and with OSHA regulations requiring lifting assistance for items heavier than 40 pounds, there is a need for a better part removal approach.

The present disclosure overcomes these difficulties by presenting a platen system that includes both a vacuum source for securing a building substrate onto the platen surface and also a pressurized fluid source, such as pressurized air, for creating a fluid or air bearing that facilitates removal of the part and substrate from the platen surface. The presently described platen system can be used as platen 14 in the additive manufacturing system 10 of FIG. 1 or in place of the build platform in the multi-axis robotic build system 100 of FIG. 2, for example. Moreover, teachings of the described platen assembly can also be incorporated into other build platforms, such as trunnion tables, rocking cradles, rail or gantry mounted motion platforms, and the like.

FIG. 1 is a schematic front view of an exemplary additive manufacturing system 10. As shown in FIG. 1, system 10 is an extrusion-based additive manufacturing system for 3D printing or otherwise building parts and support structures using a layer-based, additive manufacturing technique, where the part can be printed from part material and support structures can be printed from support material. Suitable extrusion-based additive manufacturing systems for system 10 include fused deposition modeling systems developed by Stratasys, Inc., Eden Prairie, Minn. under the trademark "FDM".

In the illustrated embodiment, system 10 includes chamber 12, platen 14, platen gantry 16, print head 18, head gantry 20, and consumable assemblies 22 and 24. Chamber 12 is an enclosed environment that contains platen 14 and any printed objects 30, 32. Chamber 12 can be heated (e.g., with circulating heated air) to reduce the rate at which the part and support materials solidify after being extruded and deposited. In alternative embodiments, chamber 12 can be omitted and/or replaced with different types of build environments. For example, parts can be built in a build environment that is open to ambient conditions or may be enclosed with alternative structures (e.g., flexible curtains).

Platen 14 is a platform on which printed parts 30 and support structures 32 are printed in a layer-by-layer manner. In some embodiments, platen 14 may also include a flexible polymeric film or liner on which the printed parts and support structures are printed, to allow for easy part separation from the platen. In the illustrated example, print head 18 is a dual-tip extrusion head configured to receive consumable filaments from consumable assemblies 22 and 24 (e.g., via feed tube assemblies 26 and 28) for printing 3D part 30 and support structure 32 on platen 14. Consumable assembly 22 may contain a supply of a part material, such as a high-performance part material, for printing printed part 30 from the part material. Consumable assembly 24 may contain a supply of a support material for printing support structure 32 from the given support material.

Platen 14 is supported by platen gantry 16, which is a gantry assembly configured to move platen 14 along (or substantially along) a vertical z-axis. Correspondingly, print head 18 is supported by head gantry 20, which is a gantry assembly configured to move print head 18 in (or substantially in) a horizontal x-y plane above chamber 12. In an alternative embodiment, platen 14 may be configured to move in the horizontal x-y plane within chamber 12 and print head 18 may be configured to move along the z-axis. Other similar arrangements may also be used such that one or both of platen 14 and print head 18 are moveable relative to each other over a desired number of degrees of freedom. Platen 14 and print head 18 may also be oriented along different axes. For example, platen 14 may be oriented vertically and print head 18 may print printed part 30 and support structure 32 along the x-axis or the y-axis.

The print head 18 can have any suitable configuration. Examples of suitable devices for print head 18, and the connections between print head 18 and head gantry 20 include those disclosed in Crump et al., U.S. Pat. No. 5,503,785; Swanson et al., U.S. Pat. No. 6,004,124; LaBoissiere, et al., U.S. Pat. Nos. 7,384,255 and 7,604,470; Leavitt, U.S. Pat. No. 7,625,200; Batchelder et al., U.S. Pat. No. 7,896,209; Comb et al., U.S. Pat. No. 8,153,182; Leavitt, U.S. Pat. No. 7,625,200; and Swanson et al., U.S. Pat. Nos. 8,419,996 and 8,647,102.

System 10 also includes controller 34, which can include one or more control circuits configured to monitor and operate the components of system 10. For example, one or more of the control functions performed by controller 34 can be implemented in hardware, software, firmware, and the like, or a combination thereof. Controller 34 can communicate over communication line 36 with chamber 12 (e.g., with a heating unit for chamber 12), print head 18, and various sensors, calibration devices, display devices, and/or user input devices.

System 12 and/or controller 34 can also communicate with computer 38, which can include one or more discrete computer-based systems that communicate with system 12 and/or controller 34, and may be separate from system 12, or alternatively may be an internal component of system 12. Computer 38 includes computer-based hardware, such as data storage devices, processors, memory modules, and the like for generating and storing tool path and related printing instructions. Computer 38 may transmit these instructions to system 10 (e.g., to controller 34) to perform printing operations.

A digital model representative of a 3D part to be printed can be created, such as by scanning an existing 3D object to create a digital image file, or such as by creating a 3D model using a computer-aided design (CAD) program. The digital model and/or instructions for printing the model can be loaded into computer 38. The computer 38 can communicate with controller 34, which serves to direct the system 10 to 3D print the part 30 and optionally, a support structure 32. Part material is deposited in layers along tool paths that build upon one another to form the part 30.

FIG. 2 is a perspective view of a multi-axis robotic build system 100 that may be used for building three-dimensional (3D) parts utilizing two-dimensional tool paths, three-dimensional tool paths and combinations thereof. System 100 includes in one embodiment a robotic arm 102 capable of movement along six axes. An exemplary robotic arm is an industrial robot manufactured by KUKA Robotics of Augsburg, Germany. While six axes of motion are discussed for the robotic arm 102 from a stationary base, it should be understood that additional axes or other movements are also amenable to use with the embodiments of the present disclosure, without departing therefrom. For example, the robotic arm 102 could be mounted to move on a rail or a gantry to provide additional degrees of freedom. The robotic arm 102 carries a print head 104, such as, by way of example only and not by way of limitation, a print head similar to print head 18 described above, for printing parts from a filament feedstock. A build platform 106 is provided, which in one embodiment is movable along two axes of rotation, rotation about the z-axis, and tilting (rotation) about the x-axis. A controller 108 contains software and hardware for controlling the motion of the robotic arm 102 and the build platform 106, as well as the printing operation of the print head 104.

A generated tool path is utilized to control motion of the robotic arm 102. However, control of the extrusion head is also used to accurately deposit material along the generated tool path. For example, one embodiment of the present disclosure synchronizes timing of the motion of the robotic arm 102 with print head 104 to extrusion from the print head 104. Embodiments of the present disclosure provide for speed up or slowdown of printing, changing the extrusion rate in conjunction with robotic movements, tip cleaning, tip changing, and other actions of the print head 104 based on the generated tool path and motion of the robotic arm 102. As an example, extrusion from the print head 104 may be synchronized with motion of the robotic arm 102 in manners taught by Comb et al. U.S. Pat. No. 6,054,077; and Comb U.S. Pat. Nos. 6,814,907, 6,547,995, and 6,814,907.

The part may be fabricated on a polymeric sheet substrate releasably adhered to a build platen. The polymeric sheet substrate acts as a foundation or base on which to begin extrusion of material. As is described in Comb et al., U.S. Pat. No. 5,939,008, vacuum pressure may be applied between the polymeric sheet substrate and the build platen to secure the sheet to the platen. After the part is formed, the vacuum pressure may be released. However, the size and/or weight of the formed part on the substrate may hinder removal of the substrate and part from the platen surface, and from the machine.

The present disclosure is directed to a retention and release platen system 200 for use in an extrusion-based additive manufacturing system, such as exemplary systems 10 or 100, to print or form 3D parts. For example, when using a build system 10 such as shown in FIG. 1, the system 10 can be configured to build upon the disclosed platen of system 200 rather than platen 14. When using a multi-axis robotic build system 100 as in FIG. 2, the system 100 can be configured to build upon the disclosed platen of system 200 rather than the illustrated build platform 106. The platen system 200 improves alignment and retention of a sheet substrate 208 to a build platen onto which a part 30 and if needed, associated support structures 32, are built. After the printing process is complete, the system 200 allows for application of an air bearing to facilitate removal of the printed part 30 on the sheet substrate 208 from the build platen.

Figure 3:
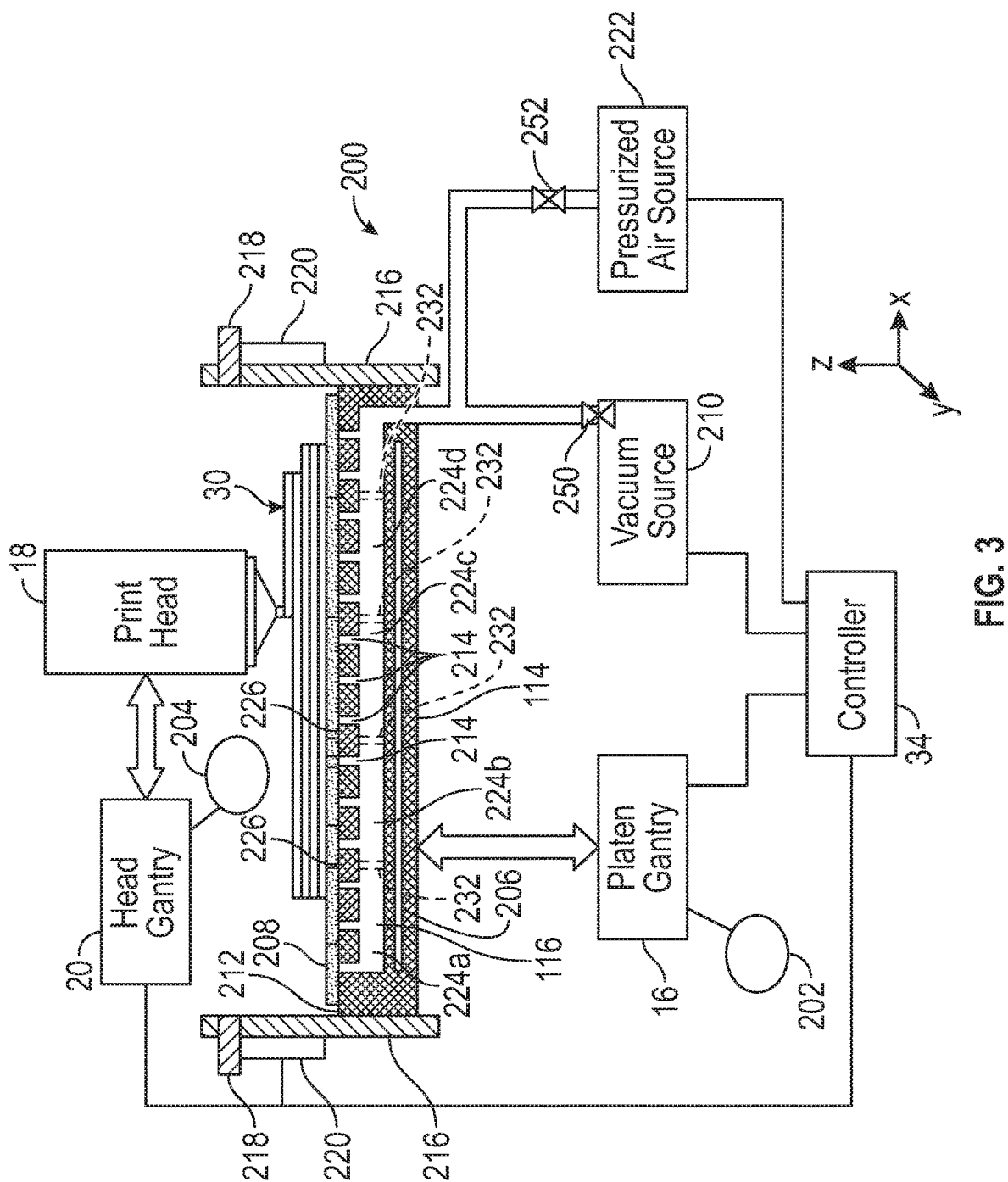
FIG. 3 is a simplified diagram of portions of an exemplary platen assembly configured for use as build platform in a 3D printing system.

FIG. 3 is an exemplary embodiment of retention and release platen system 200, shown in use with print head 18 and head gantry 20 driven by one or more x-y motors 204. System 200 is shown schematically as including a platen 114, controller 34, vacuum source 210 having a vacuum valve 250, pressurized air source 222 having a pressurized fluid valve 252, and an optional platen gantry 16 driven by a z-axis motor 202. FIG. 3 illustrates the printing of an exemplary part 30 on sheet substrate 208, which is supported on platen 114 of retention and release platen system 200. Sheet substrate 208 is a flexible sheet formed of a polymeric material, such as nylon or acrylic, for example, as is described above. A non-limiting, exemplary sheet substrate 208 is in the form an acrylic sheet having a thickness of about 0.06 inch.

As illustrated in FIG. 3, platen 114 of system 200 has an outward-facing surface 212 configured as a build platform or a build table for retaining and supporting sheet substrate 208. Platen 114 further comprises an interior manifold 116 located beneath platen surface 212. Manifold 116 is coupled to vacuum source 210, controlled by vacuum valve 250 (which can be activated to create a vacuum in response to signals from controller 34) and pressurized air source 222, controlled by pressurized fluid valve 252 (which can be activated to produce an air bearing in response to signals from controller 34). Platen surface 212 includes a plurality of holes 214 that expose sheet substrate 208 to the vacuum produced by vacuum source 210 and to the pressurized air supplied by pressurized air source 222, which are alternately applied under control of the controller 34. When the vacuum source 210 is activated, the sheet substrate adheres to the surface 212 under vacuum. The holes are sized to be small enough to enable the vacuum source to provide adequate suction to the corners of the substrate 208, holding it in place. When the pressurized air source 222 is activated, an air bearing is created beneath the sheet substrate.

Figure 5:
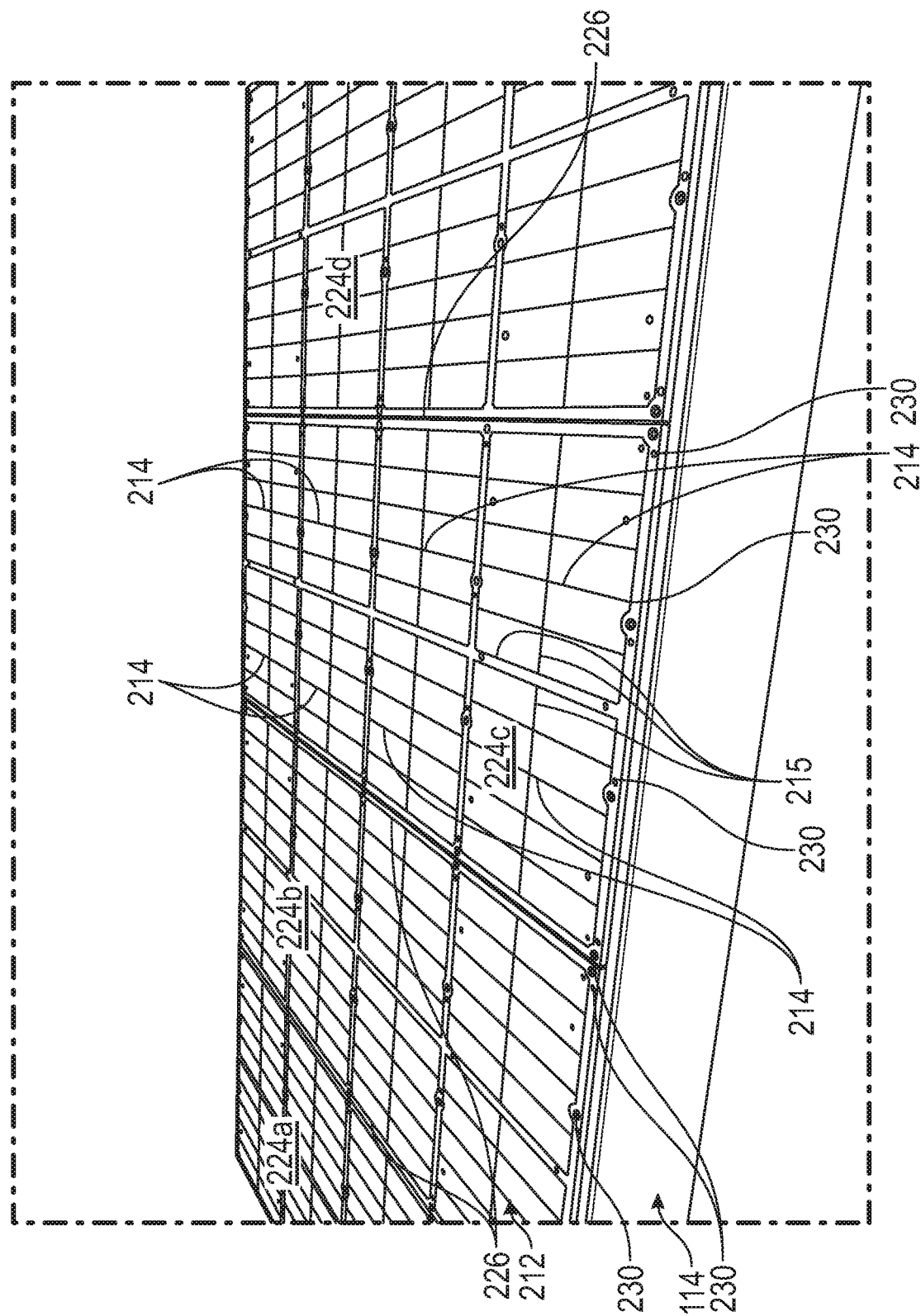
FIG. 5 is a partial top perspective view of an exemplary modular platen.

As shown in FIG. 5, in a non-limiting, exemplary embodiment, each of holes 214 is connected to a plurality of grooves 215, and grooves 215 are arranged in a grid configuration that includes holes 214. In the exemplary embodiment, the vacuum and the pressurized air are applied at different times through the same network of grooves, holes and supply tubing. The vacuum and the pressurized air may communicate through holes 214 to be distributed in the channels of grooves 215 under any object (such as sheet substrate 208), placed on platen surface 212. In alternate embodiments, separate sets of holes, grooves and/or supply tubing may be used to supply the vacuum and the pressurized air.

The vacuum produced by vacuum source 210 assists in securing sheet substrate 208 to support surface 212 of platen 114 during printing or forming of the part 30. After printing is complete (or at an earlier time when the weight of part 30 adequately holds sheet substrate 208 onto surface 212), controller 34 will signal the vacuum source 210 to deactivate the vacuum, thereby releasing the vacuum hold-down force on substrate 208, and the vacuum source can be isolated from the platen area via valving.

In an exemplary embodiment, platen 114 also serves as an air-bearing platen through the introduction of pressurized air jets through the same holes 214, but this time from pressurized air source 222. The pressurized air source 222 supplies a plurality of air jets via manifold 116 through holes 214 of platen surface 212 to create an air bearing between surface 212 of the platen 114 and the substrate 208. An air bearing is a bearing that uses a thin film of pressurized gas to provide a low friction load-bearing interface between surfaces. The air bearing of the present invention applies a lifting force to the sheet substrate 208 to lessen the force required to oppose the frictional drag of moving a heavy part across the platen, such as in removing part 30 (and its sheet substrate 208) from the platen 114 after it is built. After printing is completed, the plurality of air jets are activated to thereby enable removal of the part 30 (and sheet substrate 208) from the platen 114 by an operator or robot (such as by sliding), using lesser force than would otherwise be required on an unpressurized platen. Such removal by air conveyance can be further facilitated by tilting surface 212 to a non-horizontal position (such as is further described below), thereby allowing the sheet substrate 208, assisted by the air bearing provided through holes 214 and pressurized air source 222, to slide at an inclined angle off platen 114, further assisting with the otherwise burdensome and manual removal of the large and/or bulky printed part.

Provision of the air jets through holes 214 reduces sliding friction between sheet substrate 208 and platen surface 212. The velocity and/or pressure of air ejected through holes 214 can be adjusted by controller 34, taking into account factors such as the weight of part 30. Provision of pressurized air from pressurized air source 222 to holes 214 in platen 114 can be facilitated by suitable blowers of any configuration (not shown). The number and size of apertures 214 in platen surface 212, and the spacing between the apertures 214, may be selected to produce the both the desired vacuum suction, as well as the desired air pressure, on a bottom surface of sheet substrate 208.

Figure 4:
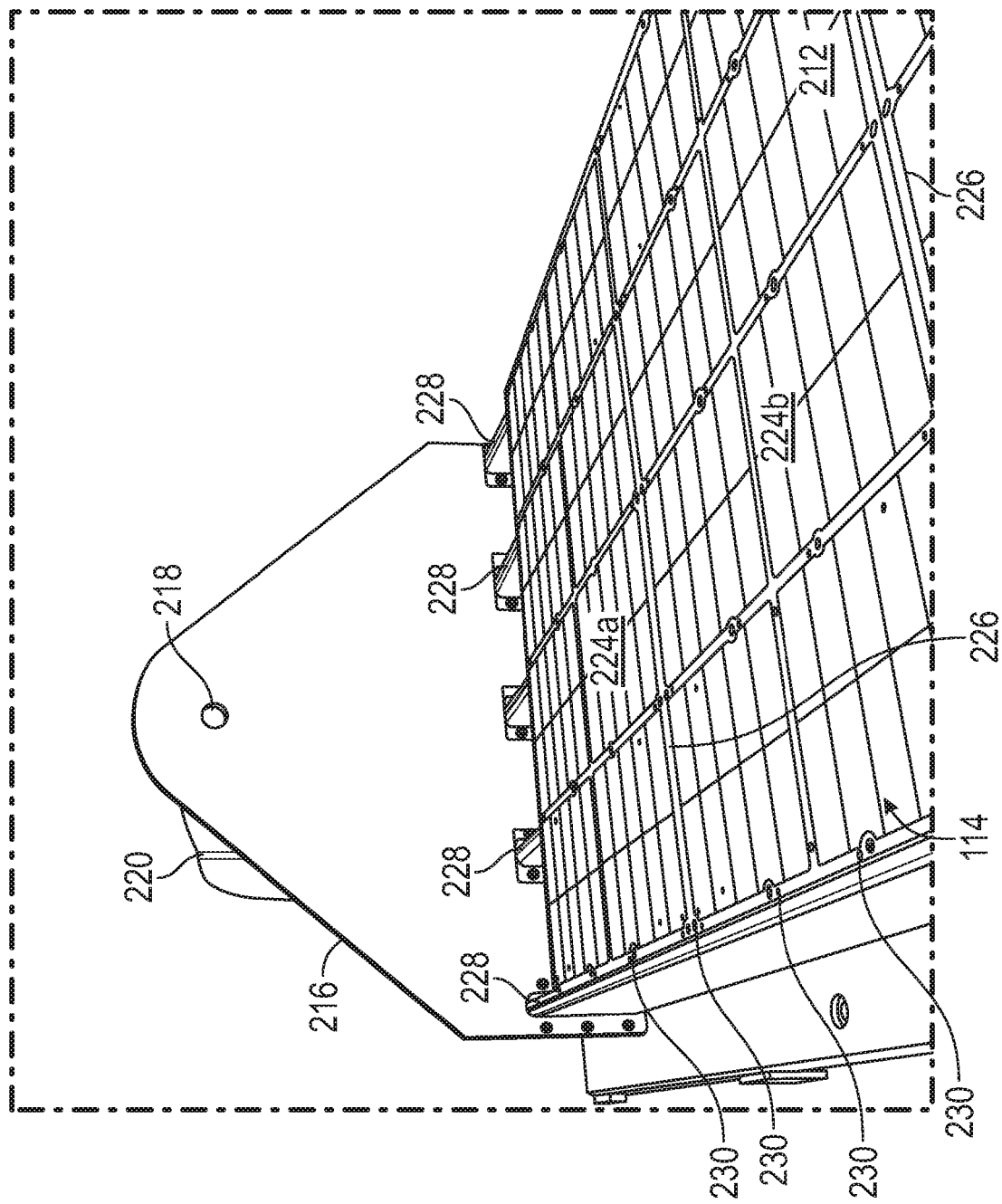
FIG. 4 is a partial perspective view of an exemplary platen, showing one pivot bracket.

As shown in FIGS. 4 and 5, in an exemplary embodiment, platen 114 is modular, in that it is formed from several platen sections 224. The number and orientation of an assembly of such multiple platen sections 224 can be selected based on the needs of a particular facility or a particular part build. For example, in an exemplary embodiment, each platen section 224 is about two feet wide and about four feet deep. As shown in FIG. 5, four such platen sections 224a, 224b, 224c and 224d are shown, with adjacent platen sections 224 being separated at joints 226. The provision of modular platen sections allows for customization of the platen size for a particular part size being built. The allowance of a custom platen size enables optimization of the vacuum source requirement, providing for increased vacuum suction supply, minimized vacuum system sizing, increased air bearing pressure supply, and minimized air pressure supply requirements.

As shown in FIG. 4, for example, each of the platen sections 224 can be secured to a rail 228 via fasteners 230 in surface 212. In an exemplary embodiment, platen 114 is formed of an aluminum alloy that evenly expands and contracts with the application of heat. Accordingly, in exemplary embodiments, securement of the platen sections 224 to rails 228 is configured to accommodate slight dimensional changes in the platen sections 224 and joints 226. In an exemplary embodiment, fasteners 230 are set screws that are not overly tightened, in order to prevent buckling or warping.

As more easily seen in FIG. 5, each platen section 224 is provided with a plurality of holes 214 through surface 212. As discussed above, a vacuum may be pulled downward through holes 214 by vacuum source 210 to secure any sheet substrate 208 or part 30 positioned above the platen 114 to the platen surface 212. Moreover, when it is desirable to remove a part 30 and/or substrate 208 from the platen surface 212, air jets may be expelled from the same holes 214 via pressurized air source 222 to assist in floating the bulk part 30 and sheet substrate 208 to facilitate their removal from platen surface 212. In the described retention release mechanism 200, the vacuum and pressurized air are provided through the same holes 214 in a platen surface 212, and the vacuum system isolated from pressurized air system via valving.

As shown in FIG. 3, in an exemplary embodiment, the platen sections 224 are divided from each other by divider walls 232 (phantom lines) at joints 226. Thus, each of the sections 224 can be isolated from each of the other sections 224. Thus, while a relatively large platen 114 can be available for use at any time, for a small build, controller 34 can be selected to control the application of a vacuum source 210 or pressurized air source 222 to only selected platen sections 224 for use in building a smaller part.

In an exemplary embodiment, platen 114 further includes an optional platen heater 206 configured to heat a top surface 212 of platen 114. This can soften a sheet substrate 208 to allow it to conform to the platen surface 212 more quickly and easily when a vacuum is pulled through the surface 212. Moreover, in an exemplary embodiment, heater 206 is modular and includes a plurality of heater sections. In one embodiment, the plurality of heater sections corresponds to the plurality of platen sections 224 in number and arrangement. Sections of heater 206 corresponding to the respective platen sections 224 can be turned on and off, and a temperature of each section 224 can be controlled independently of the other sections 224. Typically, platen 114 is not heated to more than 150 C.

It may be beneficial to utilize a gasket or seal 270 (not shown) beneath the sheet substrate 208 to surround the top perimeter of the platen 114 or any portion thereof to temper the air flow as it leaves the air pipe/channel and better contact the substrate 208. The platen 114 may include a groove or grooves for receiving the gasket 270. The gasket material may be elastomeric or rubbery, and would allow for better contact with the substrate material 208 after it is laid down on the platen 114, and either air or vacuum is turned on. When an air flow is used, if hole sizes or air flow is too large or too high, the air may blow some portions of the substrate 208 more than others. Optimally, the holes and air flow are sized together to allow for good distribution of air flow underneath the substrate 208, in order to float the substrate 208 and part 30 more easily across the platen surface 212.

In an exemplary embodiment, the platen is configured to allow tilting to an inclined position, either automatically or manually, during unloading of a printed part. In the illustrated embodiment, platen 114 is configured as a cradle that is configured to tilt about the x axis, and the platen gantry is powered (additionally or alternatively) by a motor configured move the platen 114 about a pivot axis of the platen gantry. In the exemplary embodiment shown in FIGS. 3 and 4, system 200 further includes pivot brackets 216, pivot pins 218, and drive mechanisms 220. Platen 114 is mounted on pivot brackets 216, which are configured to tilt platen surface 212 about pivot pins 218. The surface 212 of platen 114 is placed in an inclined position by tilting platen 114 about pivot pins 218. Such tilting may be directed by controller 34 through drive mechanisms 220. If desired, the use of a tilting platen mechanism, in combination with an air bearing, allows for easier sliding movement and removal of a heavy part from the machine onto a cart or conveyor system, after fabrication.

Controller 34 represents one or more control circuits comprising one or more processors that are configured to monitor and operate the components of system 200 to perform one or more functions or method steps described herein. For example, one or more of the control functions performed by controller 34 can be implemented in hardware, software, firmware, and the like, or a combination thereof. Controller 34 may communicate over communication line with print head 18, chamber 12 (e.g., with a heating unit for chamber 12), motors 202 and 204, and various sensors, calibration devices, display devices, user input devices, and/or other components of the system 200. Controller 34 may also communicate with one or more of platen 114, platen gantry 16, head gantry 20, and any other suitable component of system 200, 10 or 100. Descriptions pertaining to controller 34 also refer to controller 108 of FIG. 2.

The communication line may include one or more electrical, optical, and/or wireless signal lines, allowing controller 34 to communicate with various components of system 200. System 200 and/or controller 34 may also communicate with one or more computer-based systems (not shown), which may include computer-based hardware, such as data storage devices, processors, memory modules, and the like for generating, storing, and transmitting tool path and related printing instructions to system 200, 10 and/or 100. During operation, controller 34 may direct z-axis motor 202 and platen gantry 16 to move platen 114 to a predetermined height and/or tilted orientation. Controller 34 may then direct motors 204 and head gantry 20 to move print head 18 around in the horizontal x-y plane. Controller 34 may also direct devices in print head 18 to selectively draw successive segments of the consumable material from consumable assemblies.

Figure 6:
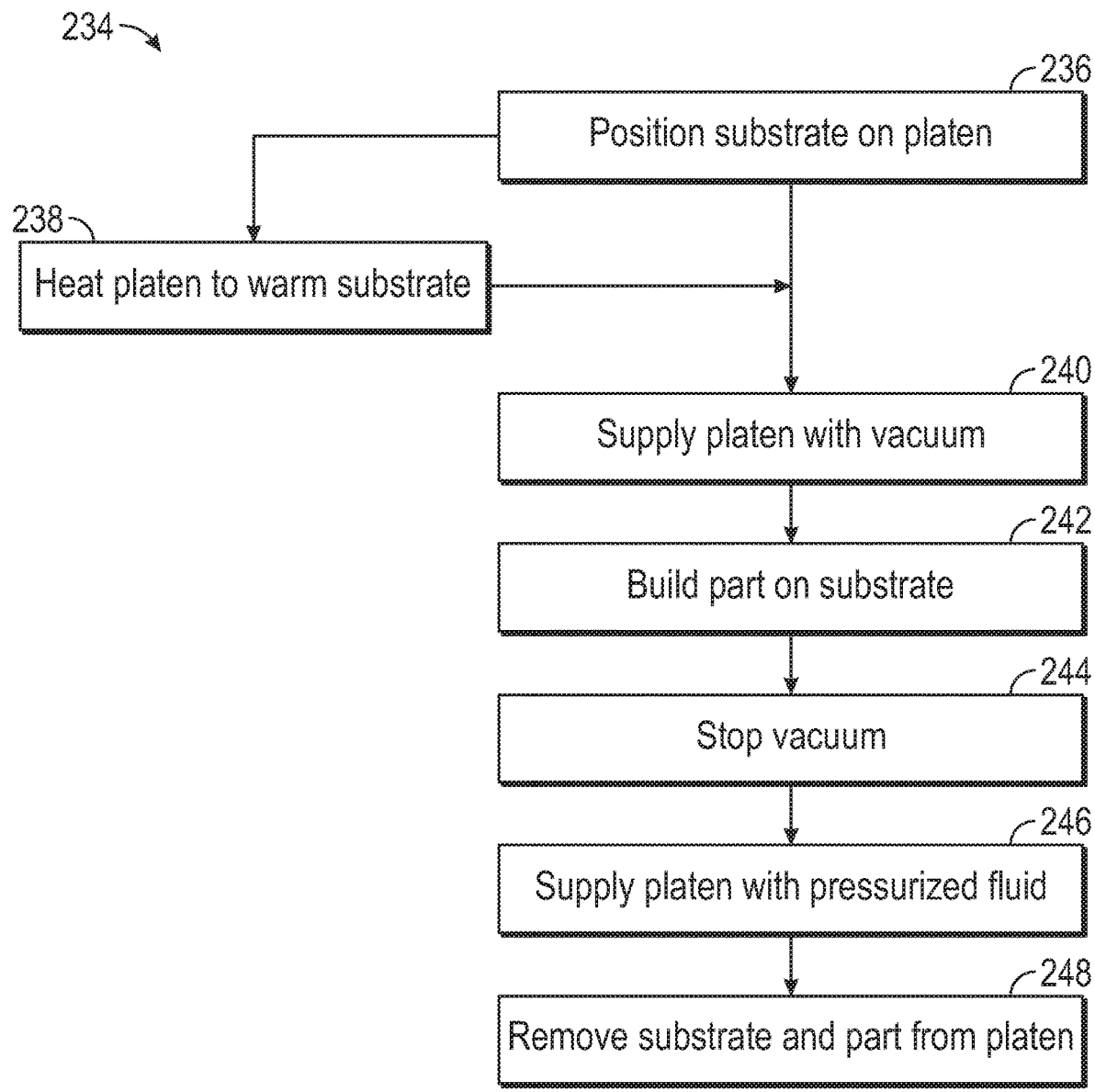
FIG. 6 is a diagram showing steps in an exemplary method of use of the disclosed platen system.

FIG. 6 is a diagram showing steps in an exemplary method for use of the retention and release platen system 200. Method 234 begins with step 236, which includes positioning sheet substrate 208 on surface 212 of platen 114. Sheet substrate 208 need not be a single sheet; rather, it can be provided in modular sections, such as those corresponding in size to platen sections 224, for example, as long as vacuum and air pressure supply holes are positioned under each individual sheet. The number and arrangement of sheet substrate sections can be selected based on the shape and position of part 30 to be built thereon. Moreover, sheet substrate sections need not be positioned exactly over correspondingly sized platen sections 224, as long as the substrate sections fully cover the portion of the platen sections 224 being used.

Step 238 is optional and includes heating platen 114 with platen heater 206 to warm the sheet substrate 208, allowing it to better and/or more quickly conform to the platen surface 212 during the next step 240. In an exemplary embodiment, platen heater 206 is in the form of a mica heater. In step 240, a vacuum is pulled through holes 214 by vacuum source 210. In step 242, a 3D printing system such as system 10 of FIG. 1 or system 100 of FIG. 2 is used to build a part 30 (and support structure 32, if any) on sheet substrate 208. In an exemplary embodiment, each print head 18 melts the successive segments of received consumable filament. The molten material is extruded and deposited onto platen 114 for 3D printing part 30 (and optionally, support structure 32) in a layer-by-layer manner.

In step 244, after part completion, the vacuum from source 210 is turned off, and vacuum valve 250 is closed. At step 246, valve 252 for pressurized air source 222 is turned on to supply air pressure to platen surface 212 through holes 214 to form an air bearing under sheet substrate 208. In step 248, with this air bearing assist, the completed part and sheet substrate are then slidably removed from platen 114 (by a user or using robotic automation). The pressurized air source 222 can then be turned off and valve 252 closed. Part 30 and support structure 32 may then be removed from substrate 208, and support structure 32 removed from part 30. The part 30 may then undergo one or more additional post-processing steps.

While this description sometimes mentions a single print head 18, it is to be understood that multiple print heads 18 can be used in a single build. Suitable devices and techniques for print heads 18 and for retaining print heads 18 are known, and include those disclosed in Swanson et al., U.S. Pat. Nos. 8,403,658 and 8,647,102. Descriptions pertaining to print head 18 and head gantry 20 also refer to print head 104 and robotic arm 102 of FIG. 2. Examples of other suitable gantry assemblies for head gantry 20 include those disclosed in Comb et al., U.S. Pat. No. 9,108,360.

In some embodiments, platen 114 may be configured to move in the horizontal x-y plane, and print head 18 may be configured to move along the z-axis, such as build system 10 of FIG. 1. Other arrangements may also be used such that one or both of platen 114 and print head 18 are moveable relative to each other. In other embodiments, such as the robotic build system 100 of FIG. 2, the platen may not need to move during the build operation (thus platen gantry 16 may be eliminated). Platen 114 and print head 18 may also be oriented along different axes than as illustrated. For example, platen 114 may be oriented vertically during a print operation in a horizontal build configuration.

In one example, multi-axis robotic build system 100 is used to build a five foot long canoe out of FDM® Nylon 12CF™, available from Stratasys, Inc. of Eden Prairie, Minn. A platen 114 was made of eight configurable two foot by two foot platen sections 224. A single axis rotation movement about pivot pins 218 was set up to allow tilting of platen 114. The platen 114 was heated with platen heater 206 to a temperature of 70 C. A sheet substrate 208 is made of Solvay Radel® polyphenylsulfone (PPSU). A sheet substrate 208 was positioned on a portion of platen surface 212 where the printing would occur. A vacuum of 25 inches of mercury (Hg) was applied to the substrate 208 through holes 214. The vacuum from vacuum source 210 caused the substrate sheet 208 to seal into place on platen surface 212. The canoe 30 was printed and upon completion weighed about 150 pounds. The vacuum source 210 and platen heater 206 were turned off. The canoe 30 was allowed to cool completely, and valving 252 to an air pressure supply 222 was turned on manually, to an extent at which the canoe 30 was slightly cushioned from the surface 212. The platen 114 was rotated at a slight incline about pivot pins 218, and the canoe was manually and easily slid off of the platen surface 212 and onto a portable cart.

Although the subject of this disclosure has been described with reference to several embodiments, workers skilled in the art will recognize that changes may be made in form and detail without departing from the scope of the disclosure. In addition, any feature disclosed with respect to one embodiment may be incorporated in another embodiment, and vice-versa.

What is claimed is:

1. A system for 3D printing a part, comprising:
   a platen having a platen surface including a plurality of holes therethrough and having an interior manifold in fluid communication with the plurality of holes, wherein the platen surface is configured to receive a build substrate;
   a vacuum source coupled to the manifold and configured to create a vacuum on the platen surface through the plurality of holes to thereby adhere the build substrate to the platen;
   an extrusion head configured to print parts by extruding beads of thermoplastic material and depositing the beads of thermoplastic material along tool paths onto the substrate to print a first layer, wherein additional layers are printed one on top of the other to print the 3D part; and
   a pressurized air source coupled to the manifold and configured to eject pressurized air through the plurality of holes so as to create an air bearing on the platen surface, to thereby facilitate removal of the build substrate and the 3D part from the platen.

2. The system of claim 1, further including a controller configured:
   to control operation of a first mechanism to create the vacuum; and
   to control operation a second mechanism to eject the pressurized air at a different time from creating the vacuum.

3. The system of claim 2, wherein at least one of the first mechanism or the second mechanism is a valve.

4. The system of claim 1, further including a heater configured to heat at least a portion of the platen surface.

5. The system of claim 1, further including pivot pins on which the platen is mounted to allow tilting of the platen surface about a pivot axis, wherein the tilting of the platen surface aids in the removal of the 3D part from the platen surface.

6. The system of claim 1, wherein the platen is modular and includes a plurality of platen sections, and wherein the vacuum source and the pressurized fluid source are each configured to be controllable to selected platen sections of the plurality of platen sections.

7. The system of claim 6, wherein the platen further includes a heater configured to heat at least a portion of the platen surface, wherein the heater is modular and includes a plurality of heater sections, and the plurality of heater sections corresponds to the plurality of platen sections in number and arrangement.

8. The system of claim 1, wherein the platen surface further includes a plurality of grooves arranged in a grid configuration that includes the plurality of holes.

9. The system of claim 1, wherein the platen surface further includes one or more grooves for receiving a gasket.

10. A method for 3D printing a part, comprising:
    providing a platen having a platen surface including a plurality of holes therethrough;
    positioning a sheet substrate on the platen surface;
    pulling a vacuum through the one or more holes to secure the sheet substrate on the platen surface during part fabrication;
    printing a part on the sheet substrate by moving a print head along a tool path and extruding material in the tool path to print a plurality of stacked layers that form the part; and
    ejecting pressurized air through the one or more holes after the part is printed to create an air bearing on the platen surface beneath the substrate to facilitate removal of the printed part and sheet substrate from the platen surface.

11. The method of claim 10 further including tilting the platen surface after the part is printed to assist in part removal.

12. The method of claim 10, further including heating the platen prior to pulling the vacuum.

13. The method of claim 10, wherein the platen further includes an interior manifold in fluid communication with the plurality of holes and the vacuum and pressurized fluid are supplied to the one or more holes through the manifold.

14. The method of claim 10, wherein the platen includes a plurality of platen sections, and wherein pulling the vacuum includes pulling the vacuum through the plurality of holes of at least one section of the plurality of platen sections.

15. The method of claim 10, wherein the platen includes a plurality of platen sections, and wherein ejecting the pressurized air includes ejecting the pressurized air through the holes of at least one section of the plurality of platen sections.

16. The method of claim 10, wherein the platen includes a plurality of platen sections, the method including heating a selection of the plurality of platen sections.

17. The method of claim 10, wherein the platen surface further includes a plurality of grooves arranged in a grid configuration that includes the plurality of holes.

18. The method of claim 10, wherein the platen surfaces include one or more grooves for receiving a gasket, and wherein the sheet substrate includes a gasket configured to be received by the grooves.

* * * * *